A. ATKINSON.
WIND SCREEN FOR SIDE CARS.
APPLICATION FILED MAR. 7, 1916.
1,223,551.
Patented Apr. 24, 1917.
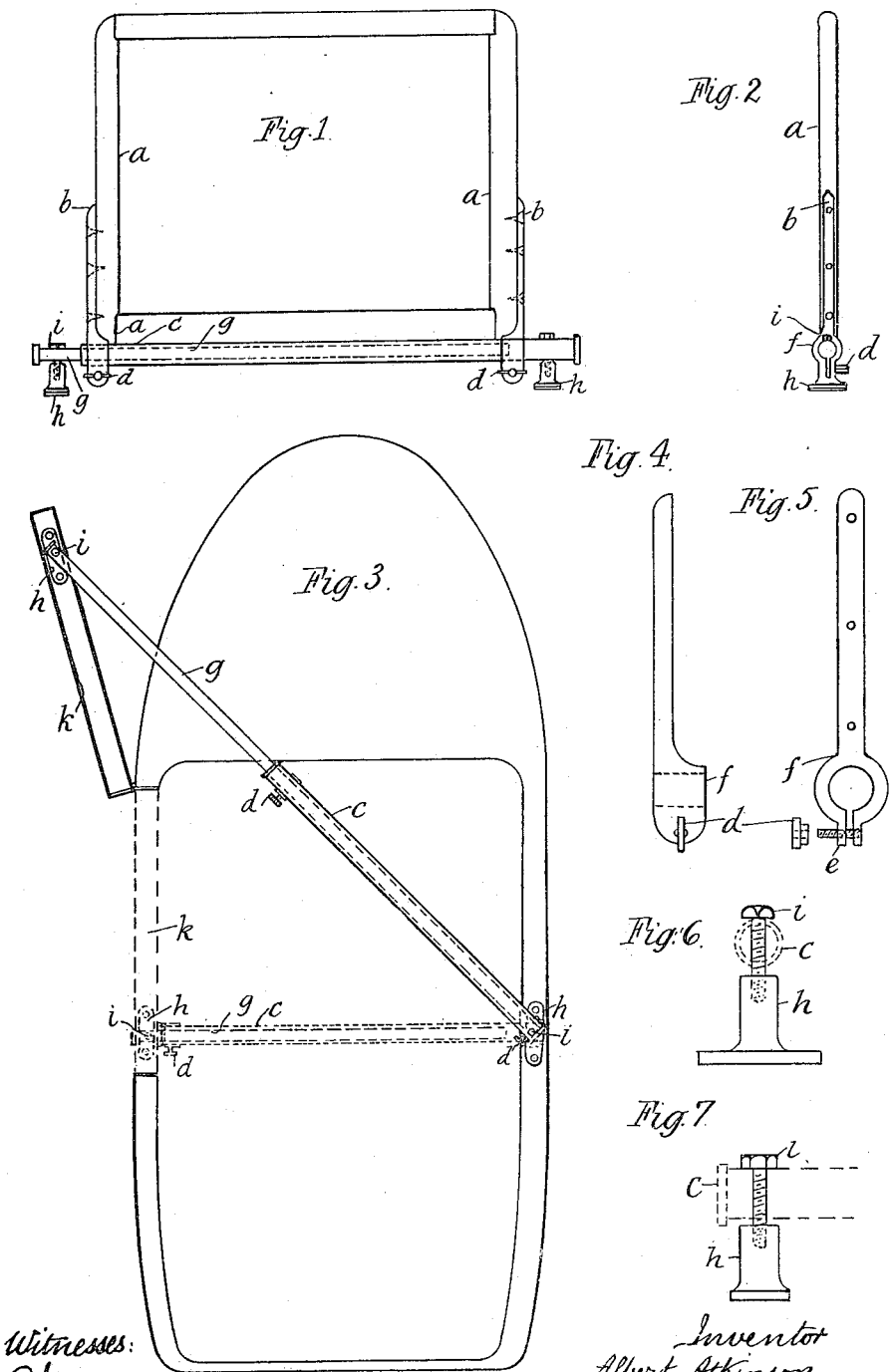

UNITED STATES PATENT OFFICE.

ALBERT ATKINSON, OF LONDON, ENGLAND.

WIND-SCREEN FOR SIDE CARS.

1,223,551.  Specification of Letters Patent.  Patented Apr. 24, 1917.

Application filed March 7, 1916. Serial No. 82,607.

*To all whom it may concern:*

Be it known that I, ALBERT ATKINSON, a subject of the King of England, residing at London, in the Kingdom of England, have invented a new and useful Wind-Screen for Side Cars, of which the following is a specification.

My invention has reference to windscreens for sidecars which are fitted close up to the passenger.

Windscreens of this kind have the disadvantage that a passenger cannot enter or alight from the sidecar until the fastening screw is loosened and the screen itself swung forward by hand.

The present invention is intended to overcome such objections in a simple, efficient and automatic manner, hereinafter explained, while a further object is to remove the necessity of making a different size of screen for each type of sidecar.

To attain my said objects I fit the screen-frame on two telescoping members so that as the door is opened the inner member will be automatically drawn out and the screen allowed to pivot back; the door space is therefore left clear for a passenger to enter or alight from the sidecar.

The screen is pivotally secured to the outer telescoping member and can therefore swing or revolve from a horizontal to a vertical position thus giving an adjustable radius of 150 degrees or more if the construction of the sidecar permits. The fittings allow the screen to be held securely at any angle while it can also be adjusted laterally to suit the varying widths of different makes of sidecars.

The illustrations forming part of this description show the invention clearly and in these illustrations, Figure 1 is a front elevation, and Fig. 2 a corresponding side view of my improved arrangement; Fig. 3 shows a plan of the screen applied to a sidecar, when the door is open, the dotted lines representing the normal position, *i. e.* when the door is closed; Figs. 4 to 7 show details of fittings for the screen.

The screen-frame $a$ is held by two arms or brackets $b$ mounted on a tubular member $c$ in such a manner that it can swivel and be adjusted laterally thereon. The brackets $b$ are held rigidly in place and at any desired angle by clamping screws $d$. For this purpose the said brackets $b$ are split longitudinally at their lower extremities $e$ and form bosses $f$ to take around the member $c$ (Figs. 4 and 5).

A rod or the like $g$ can telescope or slide in the tubular member $c$ and has at its free end a standard or bearing $h$ which is secured to the door $k$ of the sidecar. The member $c$ has a similar bearing which is fitted to the side of the body opposite the door. Both the said telescoping members are secured to the bearings $h$ by clamping screws $i$ (Figs. 6 and 7) which however permit the parts $c$ and $g$ to pivot around or on these bearings $h$.

The action is as follows:—

As the door is opened, the member $g$ is caused to automatically draw out from the member $c$ whereby the screen is made to pivot around the bearing $h$ of the member $c$, so leaving a free and clear entrance or exit for the passenger.

I claim:

1. An automatically operated windscreen for sidecars comprising telescoping members pivotally mounted at each end on bearings fitted respectively to the body and the door of the sidecar, one of the members carrying the windscreen, as and for the purpose described.

2. An automatically operated windscreen for sidecars comprising telescoping members pivotally mounted at each end on bearings fitted respectively to the body and the door of the sidecar, one of the members carrying the windscreen, and means for adjusting the screen laterally and angularly as and for the purpose described.

ALBERT ATKINSON.

Witnesses:
 JEAN BOURREL,
 WILLIAM COTTLE.

Copies of this patent may be obtained for five cents each, by addressing the "Commissioner of Patents, Washington, D. C."